United States Patent [19]
Gall

[11] 3,873,491

[45] Mar. 25, 1975

[54] POLYALKYLENE TEREPHTHALATE MOLDING RESIN AND PROCESS FOR MAKING SAME

[76] Inventor: John S. Gall, 1310 Belmont Ave., North Haledon, N.J. 07508

[22] Filed: Feb. 14, 1974

[21] Appl. No.: 442,546

Related U.S. Application Data

[63] Continuation of Ser. No. 46,823, June 16, 1970, abandoned.

[52] U.S. Cl............................ 260/40 R, 260/DIG. 24
[51] Int. Cl.............................................. C08g 51/04
[58] Field of Search..................... 260/40 R, DIG. 24

[56] References Cited
UNITED STATES PATENTS 3,624,024  11/1971  Caldwell et al................. 260/40 R
3,751,396  8/1973   Gall................................. 260/40 R
3,814,725  6/1974   Zimmerman et al............. 260/40 R Primary Examiner—Donald E. Czaja
Assistant Examiner—S. M. Person
Attorney, Agent, or Firm—Thomas J. Morgan; Linn I. Grim

[57] ABSTRACT

Process and resultant product for reducing the burning properties of an intimate blend of polypropylene terephthalate or polybutylene terephthalate and a reinforcing agent. Reduced burning is accomplished by incorporating an aromatic halide and a group Vb metal containing compound into the polymer, preferably prior to introduction of the reinforcing agent.

29 Claims, No Drawings

POLYALKYLENE TEREPHTHALATE MOLDING RESIN AND PROCESS FOR MAKING SAME

This is a continuation of application Ser. No. 46,823, filed June 16, 1970 and now abandoned.

BACKGROUND OF THE INVENTION

The present invention relates to flame retardant compositions to be used in conjunction with filled polyalkylene terephthalate molding resins. More particularly, the present invention relates to reduction in the burning of an intimate blend of polypropylene interephthalate or polybutylene terephthalate molding resins and a reinforcing agent by use of aromatic halides and a group Vb metal containing compound.

Recent investigations with reinforced polypropylene terephthalate and polybutylene terephthalate molding resins have found them to be surprisingly superior to similarly reinforced polyethylene terephthalate in many important processing and performance characteristics. For example, polypropylene terephthalate and polybutylene terephthalate can be molded and otherwise processed at lower temperatures, have a shorter cycle time in the mold and do not require, as does polyethylene terephthalate, the presence of a nucleating agent to induce crystallinity. Furthermore, reinforced polypropylene terephthalate and polybutylene terephthalate molding resins have correspondingly higher tensile strength, lower water absorption and better creep (flexural) properties than does similarly reinforced polyethylene terephthalate. As a direct result, these polypropylene terephthalate and polybutylene terephthalate molding resins which were first disclosed, along with polyethylene terephthalate in U.S. Pat. No. 2,465,319 to Whinfield and Dickson, have been found to solve processing problems long associated with polyethylene terphthalate and believed, by those skilled in the art, to be equally associated with all polyalkylene terephthalates. Equally as significant these molding resins present a noticeably improved balance of performance properties which those skilled in the art, witness the extensive use of polyethylene terephthalate molding resins to the almost total exclusion of other polyalkylene terephthalates, did not believe to exist. Consequently, the superior processing requirements and physical properties of polypropylene terephthalate and polybutylene terephthalate molding resins makes them more commercially desirable, with a wider area of applicability than polyethylene terephthalate.

These molding resins do, however, have one considerable drawback — they are flammable. Quite significantly, the presence of many important reinforcing agents, such as glass, enhances rather than deters the burning rate of these molding resins. Since the reinforcing agents have a direct effect on the desirable physical — mechanical properties of these molding resins, several commercially advantageous applications are precluded.

SUMMARY OF THE INVENTION

It is an object of the present invention to provide reinforced polyalkylene terephthalate molding resins, specifically polypropylene terephthalate and polybutylene terephthalate, with intrinsic viscosities in the range of from about 0.2 to about 1.2 deciliters per gram having reduced burning and/or self-extinguishing properties. This object is attained by incorporating into the polyalkylene terephthalate an aromatic halide, a Group Vb (as taken from the Periodic Table of the Elements found in ADVANCED INORGANIC CHEMISTRY by Cotton and Wilkerson, Interscience Publishers, 1962), metal containing compound and a reinforcing agent. As can be readily appreciated the particular class of aromatic halides suitable for the present invention must be stable in the range of temperatures necessary for melt processing the polyalkylene terephthalates and capable, in conjunction with the Group Vb metal containing compound, of decomposing during combustion conditions.

It is a further object of the present invention to incorporate, into an intimate blend of polypropylene terephthalate or polybutylene terephthalate and from about 2 to about 60 weight percent of the total composition of reinforcing agent, the combination of an aromatic halide and a Group Vb metal containing compound which aids in providing the desired reduced burning and/or self-extinguishing properties at the combustion temperature of the polypropylene terephthalate or polybutylene terephthalate. The available halogen in the aromatic halide should be present in an amount from about 3.3 to about 16.6 weight percent, based on the weight of the resin; and, the available Group Vb metal in the Group Vb metal containing compound should be present in an amount from about 0.7 to about 10.0 weight percent, also based on the weight of the resin. In addition, the weight ratio of available halogen in the aromatic halide to the available Group Vb metal in the Group Vb metal containing compound should be greater than 0 and less than or equal to about 4.

DETAILED DESCRIPTION OF THE INVENTION

The base of the molding resins of this invention is a polyalkylene terephthalate polymer selected from the group consisting of polypropylene terephthalate and polybutylene terephthalate. These polymers which are of the general type described in U.S. Pat. No. 2,465,319 to Whinfield and Dickson, can be produced from the reaction product of a dibasic acid, such as terephthalic acid or a dialkyl ester of terephthalic acid (especially dimethyl terephthalate), and diols having 3 and 4 carbon atoms. Suitable diols include 1,3-propanediol, 1,4-butanediol, 1,3-butanediol, 1,2-propanediol, 1,2-butanediol 2,3-butanediol and the like.

In the productions of the polymers used in this invention, i.e., polypropylene or polybutylene terephthalate, the appropriate bis(hydroxyalkyl) terephthalate is produced as the intermediate. The bis(hydroxyalkyl) terephthalate can be prepared by reacting the dialkyl ester of terephthalic acid in which the alkyl radicals can contain from 1 to 7 carbon atoms with about two molecular proportions of the diols described above. It is preferred to use higher proportions of the diol, i.e., in excess of 1.5 moles of the diol per mole of the terephthalate derivative, since by using such proportions, the initial transesterification is caused to take place more rapidly and completely.

The reaction for the esterification is conducted under conditions of elevated temperatures and atmospheric, substmospheric or superatmospheric pressure. Normally, the desired temperatures of the reaction can range from about the boiling temperature of the reaction mixture to as high as 250°C., if desired.

After the polymer base is prepared, the reinforcing agents can be intimately blended by either dry blending or melt blending, blended in extruders, heated rolls or other types of mixers. If desired, the reinforcing agents can be blended with the monomers in the polymerization reaction as long as the polymerization reaction is not effected. Alternatively, the reinforcing agent can be added after polymerization and prior to extrusion. The types of reinforcing agents which can be used include among others glass fibers (chopped or continuous rovings) asbestos fibers, cellulosic fibers, cotton fabric paper, synthetic fibers, metallic powders and the like. The amount of reinforcing agent can range from about 2 to about 60 weight percent, preferably from about 5 to about 40 weight percent based on the total molding composition. Other additives for appearance and property improvements can be incorporated into the molding resins of this invention such as colorants, plasticizers, stabilizers, hardeners and the like.

Glass reinforced polybutylene terephthalate and polypropylene resins have important advantages over the equivalent glass reinforced polyethylene terephthalate. Compared to polyethylene terephthalate, polybutylene terephthalate and polypropylene terephthalate can be processed at much lower temperatures, at a significantly lower cycle time and with a lower mold temperature. In addition they have noticeably higher notched Izod and tensile impact, less shrinkage and lower water absorption than does polyethylene terephthalate. All of these improved processing and physical characteristics of the glass reinforced polybutylene terephthalate and polypropylene terephthalate resins are highly desirable having direct commercial ramifications, when compared to equivalent glass reinforced polyethylene terephthalate resin.

More importantly though, these improvements in processability and physical characteristics between polyethylene terephthalate on the one hand and polypropylene terephthalate and polybutylene terephthalate on the other hand are so disproportionate as to lead one to the conclusion that polypropylene terephthalate and polybutylene terephthalate are different, at least physically, from polyethylene terephthalate. That is, the improvements realized by this seemingly small change in chemical structure are so out of proportion, relative to what would be and should be expected, as to make polypropylene terephthalate and polybutylene terephthalate entirely distinct from and unrelated to polyethylene terephthalate.

These new resins do, however, have one deleterious property — they are flammable and, when burning, drip a significant quantity of flaming particles. In the hereinafter described burn test, 30 weight percent glass reinforced polybutylene terephthalate is found to burn at a rate of 2.3 inches per minute; polypropylene terephthalate burns at a similar rate. To those skilled in the art this is an unacceptable and unsafe condition, resulting in curtailed application for these otherwise highly desirable materials.

The test procedure used involves supporting, at one end, a specimen 6 inches in length by one-half inch in width in either one-sixthteenth inch or one-eighth inch thickness, by a clamp, with the longest dimension being vertical. A bunsen burner flame, having a ⅜ inch diameter tube and a blue flame three-fourths inch in height is placed under the suspended sample so that the bottom of the sample is three-eighths inch above the top of the burner tube. The test flame is allowed to remain for 10 seconds, withdrawn, and the duration of flaming or glowing combustion of the specimen is noted. If flaming or glowing combustion of the specimen ceases within 30 seconds after removal of the test flame, it is again placed under the specimen for 10 seconds immediately after flaming or glowing combustion of the specimen stops. The burn rate is calculated as the number of inches consumed by both the bunsen flame and self-combustion during one minute. According to the present description a reinforced polypropylene terephthalate or polybutylene terephthalate is considered to have reduced burning properties if, during the above combustion conditions, the burn rate is less than 1.1 inches per minute and no cripping of flaming particles occurs.

The present invention addresses itself to the problem of the flammability of polypropylene terephthalate and polybutylene terephthalate. More specifically, it addresses itself to the probelm of the flammability of an intimate blend of polypropylene terephthalate or polybutylene terephthalate with reinforcing agents since in most instances it was found that the presence of the reinforcing agent increased the burning rate of the resin.

It has been found that aromatic halides when used in conjunction with a Group V$b$ (as taken from the Periodic Table of the Elements found in *ADVANCED INORGANIC CHEMISTRY* by Cotton and Wilkerson, Interscience Publishers, 1962) metal containing compound, effectively reduced the burning properties of reinforced polypropylene terephthalate and polybutylene terephthalate. In the most preferred embodiments described hereinafter, the aromatic halides and Group V$b$ metal containing compound placed these polyalkylene terephthalates in the category of self-extinguishing resins. In the context of the present description, a material is considered self-extinguishing if, according to the above test it does not continue to burn for greater than 30 seconds once the bunsen flame is removed.

The specific aromatic halides found appropriate for purposes of the present invention are those selected from the following groups:

I
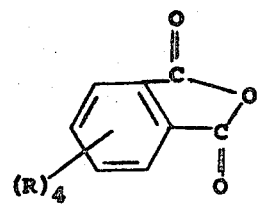

wherein R represents: hydrogen, chlorine, bromine, with at least one, preferably at least two chlorines or at least two bromines. For example, tetrabromophthalic anhydride and tetrachlorophthalic anhydride, and the like. Or, II
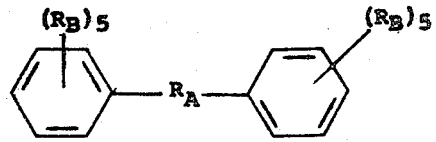

wherein $R_A$ represents: oxygen, sulfur, sulfur dioxide, methylene, phosphonates; wherein each $R_B$ represents:

hydrogen, chlorine, bromine, with at least one, preferably at least two chlorines or at least two bromines.

For example 3,5,3',5'-tetrabromobiphenyl ether or 3,5,3',5'-tetrachlorobiphenyl sulfide or 3,5-dichloro 3',5'-dibromo biphenylsulfoxide or 2,4-dichloro 3',4',5'-tribromobiphenylmethane or decabromobiphenyl ether and the like.

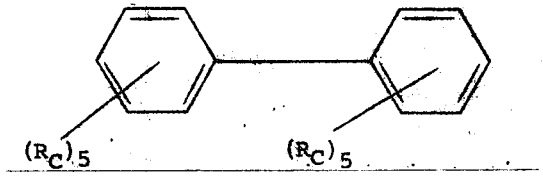

wherein each $R_C$ represents: hydrogen, chlorine, bromine with at least one, preferably at least two chlorines or at least two bromines.

For example, 2,2',4,4',6,6' hexachlorobiphenyl or 2,2',4,4',6,6' hexabromobiphenyl, and the like.

IV. 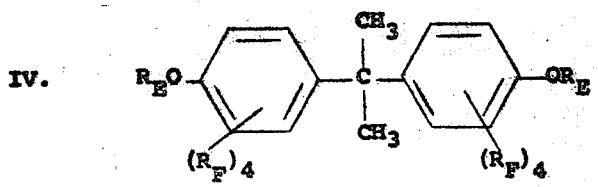

wherein each $R_E$ represents: hydrogen, acetate, methyl wherein each $R_F$ represents: hydrogen, chlorine, bromine, with at least one, preferably at least two chlorines or at least two bromines.

For example, 3,5,3',5'-tetrabromo 2,2-bis (4,4' dihydroxyphenyl) propane or 3,5-dichloro 3',5'dibromo 2,2-bis(4,4' diacetoxyphenyl) propane or 3,5,3',5'-tetrachloro 2,2-bis(4,4' dimethoxyphenyl) propane and the like.

Group Vb compounds suitable for purposes of the present invention are compounds containing phosphorous, arsenic, antimony or bismuth. Most particularly, the compounds should be selected from the oxides of these Group Vb metals, with the preferred embodiment being antimony trioxide.

The range of intrinsic viscosity of the polypropylene terephthalate and polybutylene terephthalate should be between about 0.2 to about 1.2 deciliters per gram with the preferred range being between about 0.5 to about 1.0 deciliters per gram. Reinforcing agents may be present from about 2 to about 60 weight percent, based on the weight of the total composition, the preferred range being between about 5 to about 40 weight percent. A large variety of reinforcing agents are contemplated by the present invention such as, asbestos fibers, cellulosic fibers, cotton fabric, paper, synthetic fibers, metallic powders and the like: the preferred reinforcing agent, however, is glass fiber in chopped or continuous roving form. The chopped glass fiber used can range in lengths from one-sixthteenth inch or shorter to one-fourth inch or longer.

The aromatic halide and Group Vb metal containing compound may be incorporated in the molding resins of the present invention in any standard manner. It is preferred, however, that they be added during the polymerization reaction and, prior to the introduction of the reinforcing agent. The following examples demonstrate, without limiting the present invention, preparation of the polyalkylene resins discussed herein and a method of blending in the aromatic halide and Group Vb metal containing compound.

EXAMPLE I 1200 grams of dimethylterephthalate and 900 grams of 1,4 butanediol are mixed together along with an appropriate catalyst as described in the Whinfield and Dickson U.S. Pat. No. 2,465,319, such as zinc acetate-antimony trioxide or lead oxide-zinc oxide. The temperature is increased to approximately 200°C. when 80 percent by weight of the methanol has been removed. Vacuum is applied and the temperature is raised to 240°–250°C. When the intrinsic viscosity has reached 0.65 to 0.70 dl/g, vacuum is broken and 90 grams of tetrabromophthalic anhydride and 40 grams antimony trioxide are added under nitrogen. The mass is then mixed for 5 to 10 minutes and the resultant polymer discharged and chipped in the usual manner.

EXAMPLE II

Fifteen pounds of polybutylene terephthalate blended with an aromatic halide and a Group Vb metal containing compound prepared in the manner demonstrated in Example 1, having an intrinsic viscosity of 0.82 was added to 7.7 pounds of one-eighth inch glass fibers, tumble blended for 1 minute melting the polybutylene terephthalate and then extrusion blended by force feeding through a one inch single screw extruder with a strand die. The temperatures of the extruder and die ranged from 500° to 510°F. The strands were ground in a milling type mixer to pass through a large screen (4 mesh or smaller).

It has been found that to obtain the desired results of the present invention a relationship exists and must be maintained between the halogen available in the aromatic halide and the Group Vb metal available in the Group Vb metal containing compound. That is, it has been discovered that to reduce the burning properties the ratio of available halogen to available Group Vb metal must be greater than 0.3 and less than or equal to about 4. Preferably, the ratio should be maintained in the range of from about 0.46 to about 3.8. It has been further discovered that when this ratio is in the most preferred range of from about 0.46 to equal to or less than about 2 the filled polypropylene terephthalate or polybutylene terephthalate molding resin can be classified as self-extinguishing.

The relationship between available halogen in the aromatic halide and available Group Vb metal in the Group Vb metal containing compound is demonstrated by the following table using the material and procedure of Example II:

TABLE I

| Sample | Composition | Br/Sb Ratio | Burn Rate | Drips | Self-Extinguishing |
|---|---|---|---|---|---|
| 1. | Polybutylene terephthalate 30% glass fiber filled | — | 2.3 in/min | Yes | No |
| 2. | Polybutylene terephthalate 30% glass fiber filled 6.1% Tetrabromophthalic anhydride | | 2.0 in/min | No | No |

TABLE I —Continued

| Sample | Composition | Br/Sb Ratio | Burn Rate | Drips | Self-Extinguishing |
|---|---|---|---|---|---|
| 3. | Polybutylene terephthalate 30% glass fiber filled 4.71% tetrabromophthalic anhydride .94% antimony trioxide | 4.1 | 2.4 in/min | No | No |
| 4. | Polybutylene terephthalate 30% glass fiber filled 6.02% Tetrabromophthalic anhydride 1.39% antimony trioxide | 3.6 | <1.1 in/min | No | No |
| 5. | Polybutylene terephthalate 30% glass fiber filled 6.36% Tetrabromophthalic anhydride 2.73% antimony trioxide | 1.9 | <1.1 in/min | No | Yes |
| 6. | Polybutylene terephthalate 30% glass fiber filled 5.93% Tetrabromophthalic anhydride 2.83% antimony trioxide | 1.7 | <1.1 in/min | No | Yes |
| 7. | Polybutylene terephthalate 30% glass fiber filled 5.90% Tetrabromophthalic anhydride 3.18% antimony trioxide | 1.5 | <1.1 in/min | No | Yes |
| 8 | Polybutylene terephthalate 30% glass fiber filled 5.81% tetrabromophthalic anhydride 4.82% antimony trioxide | 1.0 | <1.1 in/min | No | Yes |
| 9. | Polybutylene terephthalate 30% glass fiber filled 5.51% tetrabromophthalic anhydride 9.83% antimony trioxide | 0.46 | <1.1 in/min | No | Yes |
| 10. | Polybutylene terephthalate 30% glass fiber filled 2.69% tetrabromophthalic anhydride 8.03% antimony trioxide | 0.27 | 2.6 in/min | No | No |
| 11. | Polybutylene terephthalate 30% glass fiber filled 5.12% antimony trioxide | 0 | 2.2 in/min | No | No |

Percent of tetrabromophthalic anhydride and antimony trioxide in the above samples are calculated relative to the weight of the polybutylene terephthalate.

From the data of sample 2 it can be clearly seen that while the presence of tetrabromophthalic anhydride alone suppresses dripping, the burning rate of glass fiber reinforced polybutylene terephthalate has not been improved significantly. It can also be seen, from the data of sample 3, that a ratio of 4.1 calculated as available bromine in the tetrabromophthalic anhydride to available antimony in the antimony trioxide also suppresses dripping; however, it increases even further the burn rate of the 30 percent glass fiber reinforced polybutylene terephthalate. Thus, also surprisingly, not any amount of aromatic halide or any amount of Group $Vb$ metal containing compound will accomplish the improved burning properties shown by the present invention.

As the ratio of available halogen to available Group $Vb$ metal enters the range of less than or equal to about 4 (Sample 4) both dripping ceases and the burn rate is significantly slowed, showing a noticeable improvement over glass fiber reinforced polybutylene terephthalate without the presence of an aromatic halide and a Group $Vb$ metal containing compound. As the ratio reaches and goes below 2 a further dramatic improvement is seen — the samples, absent the bunsen flame, will not burn, i.e., in addition to not dripping, when the flame is removed combustion and consumption of the sample ceases within 30 seconds.

Very similar properties will be demonstrated by reinforced polypropylene terephthalate and by the incorporation into these polyalkylenes, within the above ratios, of other aromatic halides such as for example: tetrachlorophthalic anhydride or 3,5,3'5' tetrabromobiphenyl ether or 3,5,3'5' tetrachlorobiphenyl sulfide or 3,5-dichloro 3'5'-dibromo biphenylsulfoxide or 2,4-dichloro 3'4',5'-tribromobiphenyl methane or 3,5,3'5'-tetrachlorobiphenyl phosphonate or 2,2',4,4',6,6' hexabromobiphenyl or 2,2',4,4',6,6' hexachlorobisphenyl or 3,5,3'5' tetrabromo 2,2-bis (4,4' dihydroxyphenyl) propane or 3,5 dichloro 3'5'-dibromo 2,2-bis (4,4' diacetoxyphenyl) propane or 3,5,3,'5'-tetrachloro 2,2-bis (4,4' dimethyoxyphenyl) propane, decabromobiphenylether and the like and other Group $Vb$ metal containing compound such as, for example: arsenic oxide or bismuth oxide and the like.

Equally as important as the reduction in burning properties, the present invention has demonstrated a surprising and unexpected improvement in processability and physical properties over similarly reinforced and treated polyethylene terephthalate which resins have been shown by the prior art, see for example Japanese Patent Publication No. 69/15,555 to Teijin Ltd. This remarkable difference between reinforced polyethylene terephthalate treated according to the prior art as represented by this patent and reinforced polybutylene terephthalate, treated according to the present invention, especially in such critical areas as tensile strength, flexural strength, processing temperature and mold temperature, can only be explained in terms of a synergistic effect that the combination of an aromatic halide and a Group $Vb$ metal containing compound has on polybutylene terephthalate that the combination does not have on polyethylene terephthalate.

The following table clearly shows the differences between 30 weight percent glass fiber (⅛ inch) reinforced polybutylene terephthalate blended with 6.5 weight percent tetrabromophthalic anhydride and 3 weight percent antimony trioxide and similarly reinforced and blended polyethylene terephthalate.

TABLE II

| Material: | 30% glass fiber reinforced Polybutylene Terephthalate blended with 6.5% tetrabromophthalic anhydride and 3% antimony trioxide* | 28.5% glass fiber reinforced polyethylene terephthalate blended with 6.5% tetrabromophthalic anhydride and 3% antimony trioxide |
|---|---|---|
| Processing Temperature (°C.) | 240 | 280 |
| Cycle Time (seconds) | 35 | 35 |
| Mold Temperature (°C.) | 90 | 115 |
| Notched Izod (ft-lb/in) | 2.1 | 1.6 |
| Heat Deflective Temperature (°C. at 264 psi) | 216 | 243 |
| Tensile Strength (psi) | 20,700 | 10,600 |
| Flexural Strength (psi) | 30,300 | 16,200 |
| Flexural Modulus (psi) | $1.36 \times 10^6$ | $1.5 \times 10^6$ |

*Percent of tetrabromophthalic anhydride and antimony trioxide based on the weight of the polybutylene terephthalate and polyethylene terephthalate, respectively.

From this table it will be noted that the processing temperature of the polybutylene terephthalate molding resin is 40° less, and the mold temperature is 25° less, than that of the polyethylene terephthalate. Next the table shows that the notched Izod of the polybutylene terephthalate is much higher, reflecting a greater toughness in this molding resin than the equivalently reinforced polyethylene terephthalate. Equally as significant, this comparison shows that the tensile strength and the flexural strength of polybutylene terephthalate molding resin is almost double that of the polyethylene terephthalate molding resin, while the flexural moduli are practically identical. These physical properties denote inordinate and disproportionate advantages for polybutylene terephthalate making it a more desirable product with a greater scope of applicability than polyethylene terephthalate. Very similar results are shown when polypropylene terephthalate, reinforced and treated according to the present invention is compared with polyethylene terephthalate, reinforced and treated with the same or similar flame retardants, according to the prior art.

It was further discovered that when aromatic halides and Group Vb metal containing compounds are incorporated into reinforced polypropylene terephthalates and polybutylene terephthalate, according to the present invention there is an unexpected and noticeable improvement in that the physical properties of the resin were maintained and in some instances improved. Table III demonstrates the improvements obtained.

As shown in Table III similar results for glass fiber reinforced polypropylene terephthalate would be obtained as well as for those polyalkylene terephthates and chlorine-containing aromatic halides.

In summary, the present invention of blending of specific ratios of an aromatic halide and a Group Vb metal containing compound into a reinforced polypropylene terephthalate or polybutylene terephthalate molding resin reduces the burning properties of the resin. Within a still further ratio of aromatic halide to Group Vb metal containing compound these polyalkylene terephthalates can be rendered self-extinguishing. Furthermore, the aromatic halide and Group Vb metal containing compound have a double effect on these particular molding resins. First, because of the improvements in processability and physical properties demonstrated by reinforced polypropylene terephthalate and polybutylene terephthalate when treated according to the present invention compared to reinforced polyethylene terephthalate treated in the same manner. Second, because of the improvement in properties demonstrated by reinforced polypropylene terephthalate and polybutylene terephthalate when treated according to the present invention compared to untreated reinforced polypropylene terephthalate and untreated reinforced polybutylene terephthalate.

As this invention may be embodied in several forms without departing from the spirit or essential character thereof, the present embodiments are illustrative and not restrictive. The scope of the invention is defined by

TABLE III

| Property | 30 Weight % Glass Fiber Reinforced Polybutylene Terephthalate | 30 Weight % Glass Fiber Reinforced Polybutylene Terephthalate Compounded With: 6.5 Weight % Tetrabromophthalic Anhydride Plus 3.0 Weight % $Sb_2O_3$* |
|---|---|---|
| Tensile Strength At Break 73°F, PSI | 20,100 | 20,700 |
| Elongation At Break 73°F, % | 2 | 2 |
| Flexural Strength, 5% Deformation, 73°F, PSI | 29,000 | 30,300 |
| Flexural Modulus, 73°F, PSI | $1.29 \times 10^6$ | $1.36 \times 10^6$ |
| Izod Impact Notched Ft-Lb/In of Notch | 2.0 | 2.1 |
| Heat Deflection Temp. °F, 264 PSI | 210 | 216 |
| Flammability | Burns - Drips | Self-Extinguishing - Does Not Drip |
| IV, dl/g | 0.750 | 0.771 |

* Percent of tetrabromophthalic anhydride and antimony trioxide calculated relative to the weight of polybutylene terephthalate.

What is claimed is:

1. A molding resin having reduced burning properties comprising an intimate blend of a polyalkylene terephthalate selected from the group consisting of polypropylene terephthalate and polybutylene terephthalate, the poloyalkylene terephthalate having an intrinsic viscosity in the range from about 0.2 to about 1.2 deciliters per gram, a reinforcing agent, an aromatic halide stable at temperature necessary for melt processing of the polyalkylene terephthalate and capable of decomposing at combustion temperatures of the polyalkylene terephthalate, and a Group V$b$ metal containing compound, wherein the weight ratio of available halogen in the aromatic halide to the available Group V$b$ metal in the Group V$b$ metal containing compound ranges from about 0.3 to about 4.

2. The molding resin of claim 1 wherein the reinforcing agent is present in the range of from about 2 to about 60 weight percent of the total composition, the halogen in the aromatic halide is present in an amount from about 3.3 to about 16.6 weight percent, based on the weight of the resin and the metal in the Group V$b$ metal containing compound is present in the range of from about 0.7 to about 10.0 weight percent, based on the weight of the resin.

3. The molding resin of claim 2 wherein the ratio of available halide in the aromatic halogen to the available Group V$b$ metal in the Group V$b$ metal containing compound ranges from about 0.46 to about 3.8.

4. The molding resin of claim 2 wherein the ratio of available halogen in the aromatic halide to the available Group V$b$ metal in the Group V$b$ metal containing compound ranges from about 0.46 to about 2.

5. The molding resin of claim 2 wherein the Group V$b$ metal containing compound contains a metal selected from the group consisting of antimony, arsenic and bismuth.

6. The molding resin of claim 2 wherein the Group V$b$ metal containing compound contains antimony.

7. The molding resin of claim 2 wherein the Group V$b$ metal containing compound is selected from the group consisting of the oxides of arsenic, antimony and bismuth.

8. The molding resin of claim 2 wherein the Group V$b$ metal containing compound is antimony trioxide.

9. The molding resin of claim 2 wherein the aromatic halide is selected from the group consisting of I
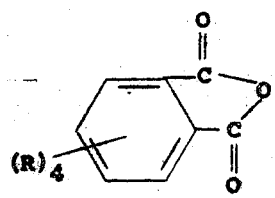

wherein at least one R represents: chlorine, bromine, and the remaining R's represent: hydrogen, chlorine, bromine:

II
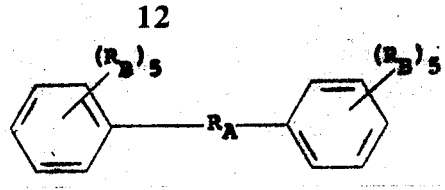

wherein $R_A$ represents: oxygen, sulfur, sulfur dioxide. methylene, phosphonates wherein at least one $R_B$ represents: chlorine, bromine, with the remaining $R_B$ representing: hydrogen, chlorine, bromine;

III
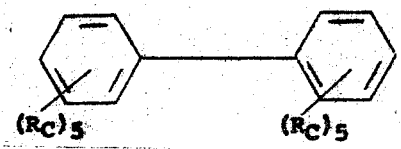

wherein at least one $R_C$ represents: chlorine, bromine, with the remaining $R_C$ representing: Hydrogen, chlorine, bromine:

IV
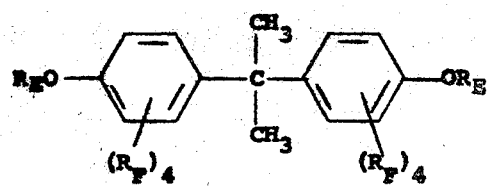

wherein each $R_E$ represents: hydrogen, acetate, methyl wherein at least one $R_F$ represents: chlorine, bromine, with the remaining $R_F$ representing: hydrogen, chlorine, bromine.

10. The molding resin of claim 9 wherein the aromatic halide has at least two halogens in the compound.

11. The molding resin of claim 10 wherein the aromatic halide is selected from the group cconsisting of tetrabromophthalic anhydride, tetrachlorophthalic anhydride, decabromobiphenyl ether and decachlorobiphenyl ether.

12. The molding resin of claim 2 wherein the reinforcing agent is glass fiber present in an amount from about 5 to about 40 weight percent, based on the total composition.

13. The molding resin of claim 12 wherein the polyalkylene terephthalate is polybutylene terephthalate.

14. The molding resin of claim 12 wherein the polyalkylene terephthalate is polypropylene terephthalate.

15. A molding resin having reduced burning properties comprising an intimate blend of a polyalkylene terephthalate selected from the group consisting of polybutylene terephthalate and polypropylene terephthalate, having an intrinsic viscosity in the range of from about 0.2 to about 1.2 deciliters per gram, from about 5 to about 60 weight percent, based on the total composition, of glass reinforcing agent, and from about 3.3 to about 16.6 weight percent halogen, based on the weight of the resin of an aromatic halide selected from the group consisting of tetrabromophthalic anhydride, tetrachlorophthalic anhydride, decabromobiphenyl ether and decachlorobiphenyl ether, and from about 0.7 to about 10.0 weight precent metal, based on the weight of the resin, of antimony trioxide, the ratio of available halogen in the aromatic halide to available antimony in the antimony trioxide being greater than about 0.46 to about 4.0.

16. The molding resin of claim 15 wherein the ratio of available halogen in the aromatic halide to available antimony in the antimony trioxide ranges from about 0.46 to about 2.

17. A process for preparing a molding resin having reduced burning properties comprising intimately blending a polyalkylene terephthalate selected from the group consisting of polypropylene terephthalate and polybutylene terephthalate, having an intrinsic viscosity in the range of from about 0.2 to about 1.2 deciliters per gram, with from about 3.3 to about 16.6 weight percent halogen, based on the weight of the resin of an aromatic halide stable at processing temperatures of the polyalkylene terephthalate and capable of decomposing at combustion temperatures of the polyalkylene terephthalate and from about 0.7 to about 10.0 weight percent metal, based on the weight of the resin of a Group V$b$ metal containing compound and wherein the ratio of available halide in the aromatic halide to available Group V$b$ metal in the Group V$b$ metal containing compound ranges from about 0.3 to about 4 and thereafter blending in from about 2 to about 60 weight percent, based on the total composition of a reinforcing agent.

18. The process of claim 17 wherein the ratio of available halide in the aromatic halide to available Group V$b$ metal in the Group V$b$ metal containing compound ranges from about 0.3 to about 3.8.

19. The process of claim 17 wherein the ratio of available halogen in the aromatic halide to available Group V$b$ metal in the Group V$b$ metal containing compound ranges from about 0.46 to about 2.

20. The process of claim 17 wherein the Group V$b$ metal containing compound contains a metal selected from the group consisting of: antimony, arsenic, bismuth.

21. The process of claim 17 wherein the Group V$b$ metal containing compound contains antimony.

22. The process of claim 21 wherein the antimony is present in the form of antimony trioxide.

23. The process of claim 17 wherein the aromatic halide is selected from the group consisting of I
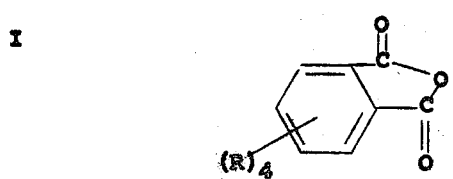

wherein at least one R represents: chlorine, bromine, and the remaining R's represent: hydrogen, chlorine, bromine;

II
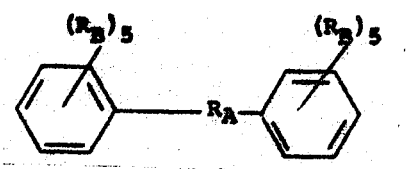

wherein $R_Z$ represents: oxygen, sulfur, sulfur dioxide, methylene phosphonates wherein at least one $R_B$ represents: chlorine, bromine, and the remaining $R_B$'s represent: hydrogen, chlorine, bromine:

III
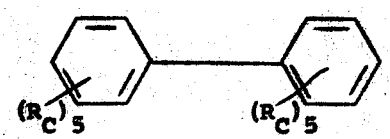

wherein at least one $R_C$ represents: chlorine, bromine and the remaining $R_C$'s represent: hydrogen, chlorine, bromine;

IV
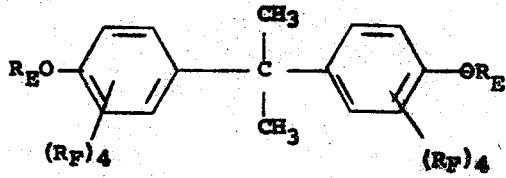

wherein each $R_E$ represents: hydrogen, acetate, methyl wherein at least one $R_F$ represents: chlorine, bromine and the remaining $R_F$'s represent: hydrogen, chlorine, bromine.

24. The process of claim 23 wherein the aromatic halide is selected from the group consisting of tetrabromophthalic anhydride, tetrachlorophthalic anhydride, decabromobiphenyl ether and decachlorobiphenyl ether.

25. A process for preparing a molding resin having reduced burning properties comprising blending a polyalkylene terephthalate selected from the group consisting of polypropylene terephthalate and polybutylene terephthalate having an intrinsic viscosity in the range of from about 0.2 to about 1.2 deciliters per gram with from about 3.3 to about 16.6 weight percent halogen, based on the weight of the resin, of an aromatic halide selected from the group consisting of tetrabromophthalic anhydride, tetrachlorophthalic anhydride, decabromobiphenyl ether and decachlorobiphenyl ether and from about 0.7 to about 10.0 weight percent metal based on the weight of the resin of an antimony containing compound wherein the ratio of available halogen in the aromatic halide to available antimony in the antimony containing compound ranges from about 0.3 to about 4, and thereafter blending in from about 2 to about 60 weight percent, based on the total composition, of glass reinforcing agent.

26. The process of claim 25 wherein the range of intrinsic viscosity of the polyalkylene terephthalate is from about 0.5 to about 1.0 deciliters per gram, wherein the antimony containing compound is antimony trioxide and wherein the ratio of available halogen to available antimony ranges from about 0.3 to about 3.8.

27. The process of claim 25 wherein the glass reinforcing agent is present in the range of from about 5 to about 40 weight percent, based on the weight of the total composition and the ratio of available halogen to available antimony ranges from 0.46 to about 2.

28. The molding resin of claim 2 wherein the reinforcing agent is asbestos fibers present in amount from about 5 to about 40 weight percent, based on the total composition.

29. The molding resin of claim 2 wherein the reinforcing agent is synthetic fibers present in amount from about 5 to about 40 weight percent, based on the total composition.

* * * * *

UNITED STATES PATENT OFFICE
CERTIFICATE OF CORRECTION

Patent No. 3,873,491             Dated    April 9, 1975

Inventor(s)   JOHN S. GALL

It is certified that error appears in the above-identified patent and that said Letters Patent are hereby corrected as shown below:

In Column 4, line 15, "cripping" should read "dripping".

In Column 13, line 43 of claim 18, "available halide" should read "available halogen".

Signed and Sealed this twenty-second Day of July 1975

[SEAL]

Attest:

RUTH C. MASON
*Attesting Officer*

C. MARSHALL DANN
*Commissioner of Patents and Trademarks*